(12) United States Patent
Averay

(10) Patent No.: US 11,323,789 B2
(45) Date of Patent: May 3, 2022

(54) LARGE-SCALE DISTRIBUTED TIMING, CALIBRATION AND CONTROL SYSTEM

(71) Applicant: BAE Systems Australia Limited, Edinburgh (AU)

(72) Inventor: Robert Dennis Averay, Alice Springs (AU)

(73) Assignee: BAE Systems Australia Limited, Edinburgh (AU)

( * ) Notice: Subject to any disclaimer, the term of this patent is extended or adjusted under 35 U.S.C. 154(b) by 116 days.

(21) Appl. No.: 16/966,330

(22) PCT Filed: Feb. 8, 2019

(86) PCT No.: PCT/AU2019/050099
§ 371 (c)(1),
(2) Date: Jul. 30, 2020

(87) PCT Pub. No.: WO2019/153048
PCT Pub. Date: Aug. 15, 2019

(65) Prior Publication Data
US 2020/0374609 A1    Nov. 26, 2020

(30) Foreign Application Priority Data
Feb. 8, 2018 (AU) ................................ 2018900388

(51) Int. Cl.
*H04B 10/00* (2013.01)
*H04Q 11/00* (2006.01)
(Continued)

(52) U.S. Cl.
CPC ....... *H04Q 11/0067* (2013.01); *H04L 7/0075* (2013.01); *H04L 43/0864* (2013.01); *H04Q 2011/0083* (2013.01)

(58) Field of Classification Search
CPC .......... H04B 10/2575; H04B 10/25752; H04B 10/25753; H04B 10/25754; H04B 10/25755; H04B 10/25756
See application file for complete search history.

(56) References Cited

U.S. PATENT DOCUMENTS 9,456,383 B2    9/2016  Gopalan et al.
2010/0272259 A1*  10/2010  Kim .......................... H04L 9/32
                                                            380/256
(Continued)

OTHER PUBLICATIONS

International Search Report and Written Opinion for Australian PCT Appl. No. PCT/AU2019/050099, dated Apr. 23, 2019, 16 Pages.
(Continued)

*Primary Examiner* — Daniel G Dobson
(74) *Attorney, Agent, or Firm* — Maine Cernota & Rardin

(57) ABSTRACT

A method of distance synchronization of a series of remote optical receiver points with an optical transmission point, the method including the steps of: (a) sending an optical timing pulse from the optical transmission point to each of the series of remote optical receiver points and back; (b) determining a round trip time of the timing pulse; and (c) storing an indicative measure of the roundtrip time of the timing pulse and utilising the indicative measure to adjust the timing of signals at the remote optical receiver points to determine the relative reception time of signals received by the series of remote optical receiver points.

4 Claims, 3 Drawing Sheets

(51) Int. Cl.
*H04L 7/00* (2006.01)
*H04L 43/0864* (2022.01)
*H04J 14/00* (2006.01)

(56) References Cited

U.S. PATENT DOCUMENTS

2014/0056162 A1    2/2014  Gopalan et al.
2014/0105263 A1    4/2014  Geile
2016/0037550 A1*   2/2016  Barabell ............. H04W 72/046
                                              455/450

OTHER PUBLICATIONS

International Preliminary Report on Patentability for Australian PCT Appl. No. PCT/AU2019/050099, dated Aug. 11, 2020, 5 Pages.

* cited by examiner

LARGE-SCALE DISTRIBUTED TIMING, CALIBRATION AND CONTROL SYSTEM

RELATED APPLICATIONS

This application is a national phase application filed under 35 USC § 371 of PCT Application No. PCT/AU2019/050099 with an International filing date of Feb. 8, 2019 which claims priority of AU Patent Application 2018900388 filed Feb. 8, 2018. Both of these applications are incorporated herein by reference in their entirety for all purposes.

FIELD OF THE INVENTION

The present invention provides for systems and methods for the distribution of timing signals to remote locations.

BACKGROUND OF THE INVENTION

Any discussion of the background art throughout the specification should in no way be considered as an admission that such art is widely known or forms part of common general knowledge in the field.

The design, construction and maintenance of large-scale phased array Radars present many challenges to system integrators and maintenance personnel in the establishment and through life support of installations. Critical to the function of phased array Radar is the ability to beamform multiple antenna elements spread across multiple shelters. This requires precise knowledge of the inherent delays within the RF path of the system, precise placement of shelter facilities, synchronisation of sample clocks, an establishment of 'normal' and 'degraded' states, and built-in test regimes to verify the state of the array at each individual element. As an array can span multiple kilometres, the effects of signal propagation times are important.

An often-used solution is centralised distribution with stabilised equi-length and equi-velocity coaxial cable or differential pair runs. In terms of site maintenance, any damage to these runs will first require recognition that damage has occurred, repair, re-characterisation of a particular cable and calibration offsets in software to restore functionality. For longer arrays, signal power levels, loss along the cable and interference become a concern as this increases baseload requirements at the central point of distribution in addition to line maintenance.

RF-over-Fibre (RFoF) is an alternate option to coax, however this is sensitive to the external environment (both at transceiver and fibre levels) and requires additional equipment to maintain, in addition to still having to characterise each length of fibre. In general, centralised calibration distribution is inherently limited to built-for-purpose sites and imposes a large up-front capital expense for operators looking to establish new sites.

SUMMARY OF THE INVENTION

It is an object of the invention, in its preferred form to provide a simplified system for the distribution of timing signals to remote, variable distance locations.

In accordance with a first aspect of the present invention, there is provided a method of distance synchronization of a series of remote optical receiver points with an optical transmission point, the method including the steps of: (a) sending an optical timing pulse from the optical transmission point to each of the series of remote optical receiver points and back; (b) determining a round trip time of the timing pulse; and (c) storing an indicative measure of the roundtrip time of the timing pulse and utilsing the indicative measure to adjust the timing of signals at the remote optical receiver points to determine the relative reception time of signals received by the series of remote optical receiver points.

In some embodiments the method also includes iteratively repeating the steps (a) to (c) to adjust the timing of signals received at the remote optical receiver points.

In accordance with a further aspect of the present invention, there is provided a timing system, including: a first transmission unit for the transmission of optical timing signals from the transmission unit to a series of receiver units; a series of receiver units interconnected to the first transmission unit, and adapted to receive the optical timing signals and retransmit the optical timing signals back to the transmission unit; a delay calculation unit, for iteratively determining a signal delay between the first transmission unit and remote receiver units; and a signal adjustment unit for adjusting signals on the basis of the determined signal delay.

The receiver units can further include optical conversion unit for receiving and converting the optical timing signals into corresponding electrical timing signals for use by the receiver unit.

BRIEF DESCRIPTION OF THE DRAWINGS

Embodiments of the invention will now be described, by way of example only, with reference to the accompanying drawings in which.

DETAILED DESCRIPTION

Figure 1:
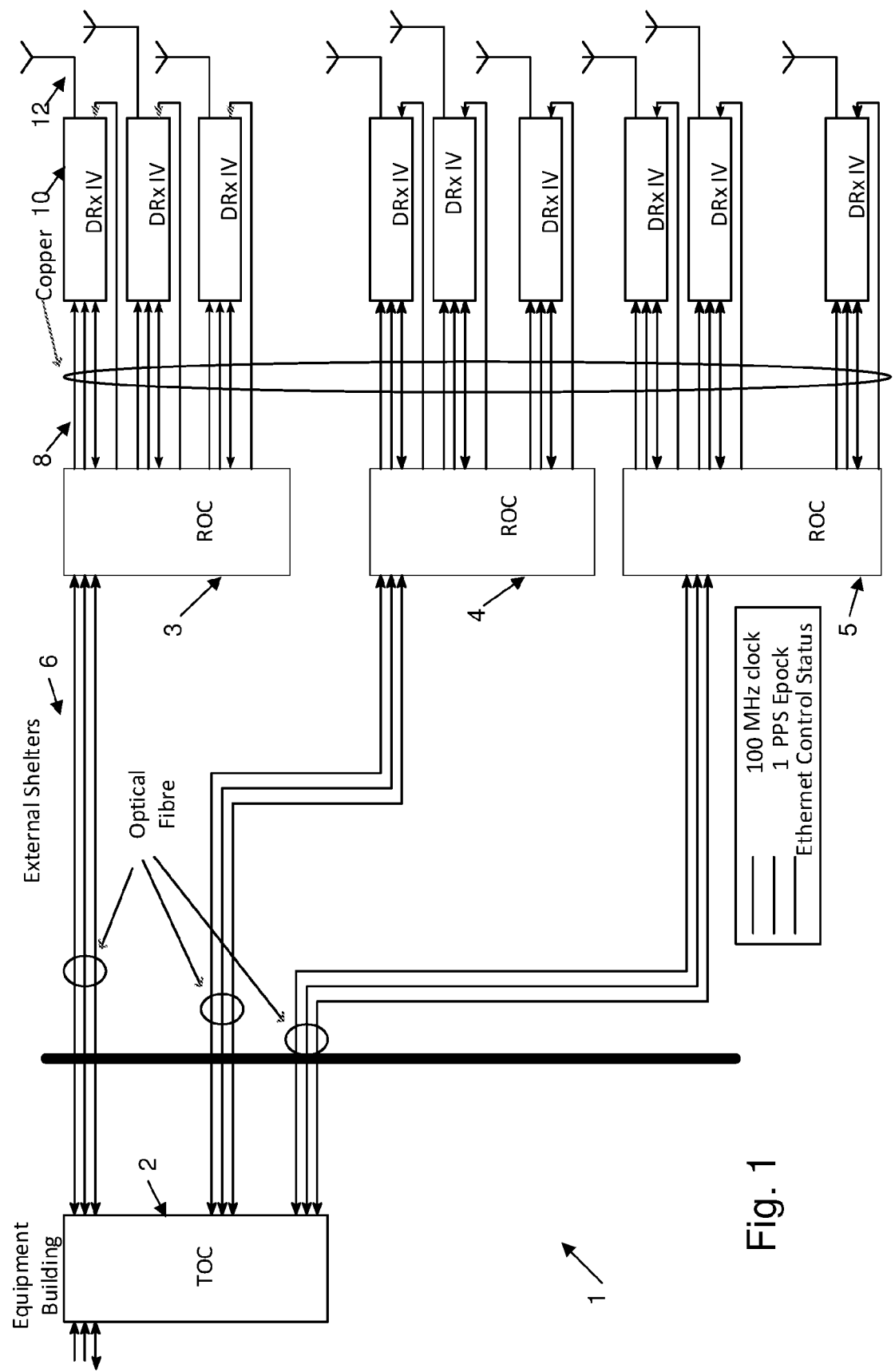
FIG. 1 illustrates an exemplar installation using a single Transmit Optical Control Unit (TOCU) distributing reference signals to remotely located Receive Optical Control Units (ROCUs), which in turn drive a set of data converters local to each ROCU.

The preferred embodiments take the concept of centralised distribution using RFoF and substantially mitigates the environmental variables that can hinder deployments in undeveloped locations and ecologically diverse locales with minimum ongoing maintenance using commercially available fibre-optic Small Form-Factor Pluggables (SFPs).

The embodiments continuously monitor the delays presented by individual fibres and internally generate an offset table. This allows ease of installation by relaxing the requirements of shelter to shelter cable lengths and automatically accounts for the natural temperature variation and its impacts on velocity factors of individual fibres; in effect, the phased array can be constructed from wildly different length reference fibre bundles. In the event of line maintenance, characterisation is an automatic activity in hardware that also applies to line variations or undetected degradations. By having a set of effectively 'phase-stable anytime, anywhere' fibre optic trunks which can be different lengths, do not require specific manufacturing requirements or installation maintenance over the long-term, many options for fulfilling the remaining pieces of timing, control and distribution are available.

The embodiments use pairs of bi-directional (dual-wavelength) fibre optic SFPs (one pair per shelter) and digital dual mixer time difference circuits implemented in an FPGAs placed at either end of the link to continuously monitor the time difference within the shelter fibres and at the central distribution point (the intra-fibre-set). This data is then used to create a continuously updated offset table referenced against a master set of fibres, allowing for beamforming to occur over the diverse distribution network.

Specific to the application of phased array Radar, these fibre optic trunks are used to modulate the reference sampling clock and the reference One Pulse Per Second (1PPS) signals to each remote optical receiver, forming a distributed reference network. From each remote optical receiver, data converters in the immediate vicinity are driven by the distributed reference network.

By having phase matched reference signals present in each shelter, calibration and Built In Self Test (BIST) is achieved through the use of a local synthesiser driven from these reference signals. The synthesiser output is phase matched to the external interface of the optical unit for distribution along with the sampling clock and 1PPS to other data converters within the shelter.

The unit located at the centralised distribution point, called the transmit optical control unit, stores and updates the lookup table for each remote optical receiver, in addition to accepting the reference sources of sampling clock and 1PPS for distribution to each of the remote optical receivers. Using the mechanism described earlier, each of the receiver units can be connected by different lengths of fibre whilst presenting itself as a phased array to the signal processing chain.

The embodiments greatly simplify the calibration and timing distribution component of a phased array Radar network. By incorporating the embodiment into new designs, less groundwork and facilities preparation is required allowing installations in undeveloped regions cost-effectively. The phase stability of the fibre optic links is maintained throughout temperature variations and line repairs without the use of environmental controls, greatly reducing the complexity of the shelter-bound units and the infrastructure requirements of the shelters themselves.

Turning initially to FIG. 1, there is illustrated schematically the operational environment of an embodiment. In this environment, a Transmit Optical Control Unit (TOCU) 2 provides optical transmission to a series of receivers, comprising Receive Optical Controller Units (ROCU) e.g. 3, 4, 5. The ROCUs interact with the TOCUs to provide for transmission of optical signals. The transmission optical fibre 6 includes 100 MHz clock, a one pulse per second (1PPS) Epoch clock and ethernet control and status signals.

The optical signals are converted by the ROCU e.g. 3 into corresponding copper wire based signals 8 for interconnection with a series of digital receivers 10. The receivers 10 are in turn connected to an antenna type devices e.g. 12 for the reception of environment RF signals and their conversion to a digital form.

There is provided a timing and testing circuit which, at periodic intervals, measures the delay between each TOCU e.g. 2 and corresponding ROCU e.g. 3-5. In this manner, the delay can be constantly compensated for in the multi antenna receiver system. The delay times are stored in a table for utilisation by timing circuits so as to factor delays between each ROCU and TOCU in phased array calculations.

Figure 2:
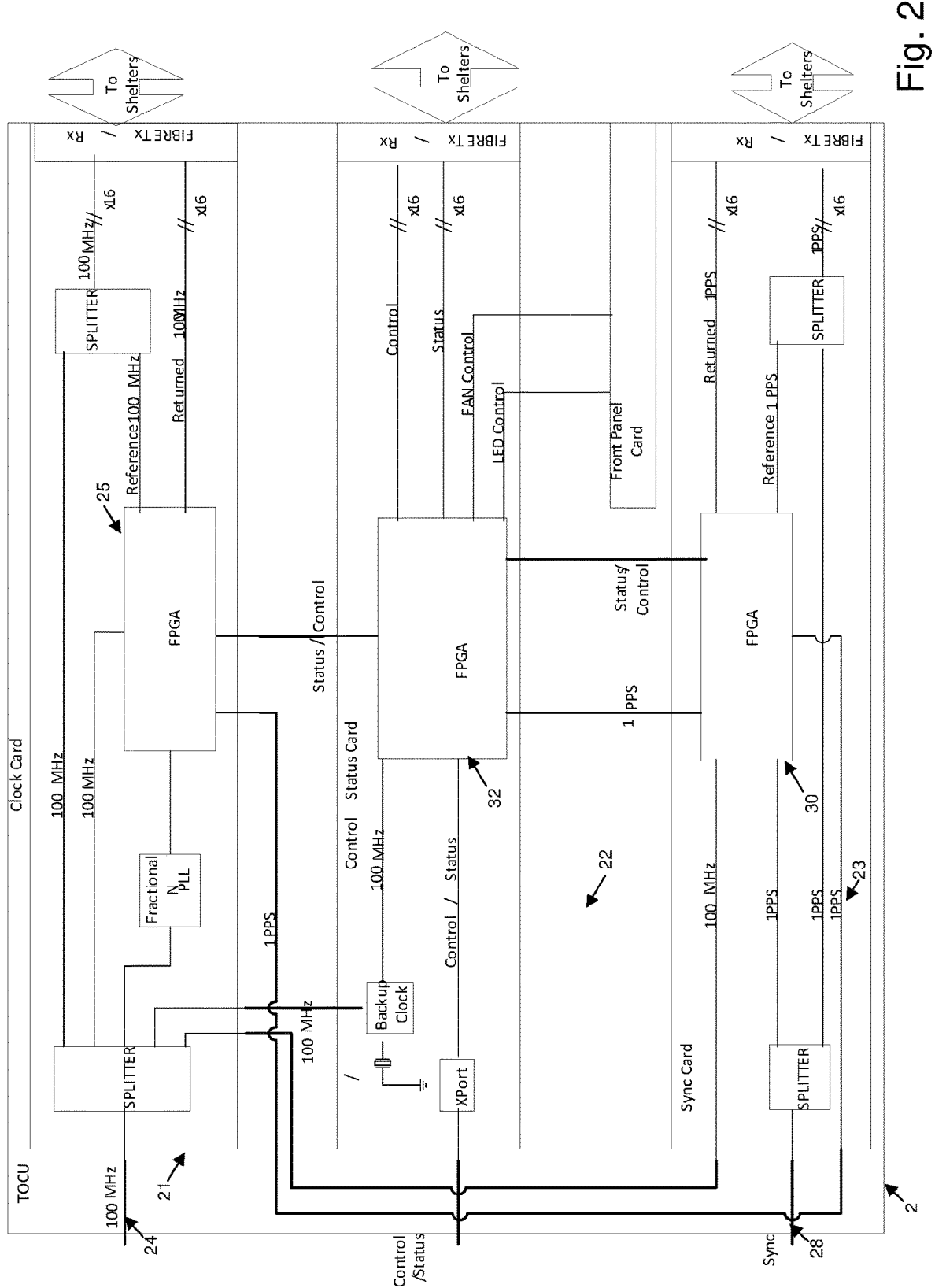
FIG. 2 illustrates the internal architecture of the Transmit Optical Control Unit (TOCU)

Turning now to FIG. 2, there is illustrated one form of TOCU 2. The TOCU includes a clock input signal 24, which can be a 100 MHz signal. This signal is forwarded to a clock card 21 which is responsible for distribution of clock signals to the various external shelters housing the ROCUs. The FPGA 25 forwards the clock signal to each shelter and received a return signal.

A 1PPS signal 28 is input from a GPS 1PPS signal creation unit (not shown). This is imported and forwarded to each shelter ROCU via Sync card 23. The return 1PPS signal is compared to determine a delay for the ROCU by FPGA 30. This delay is stored in a table and then utilised for controlling the timing of the transmission signals. Overall control can be provided by control and status card 22 which includes FPGA 32 for the control of signal delays.

Figure 3:
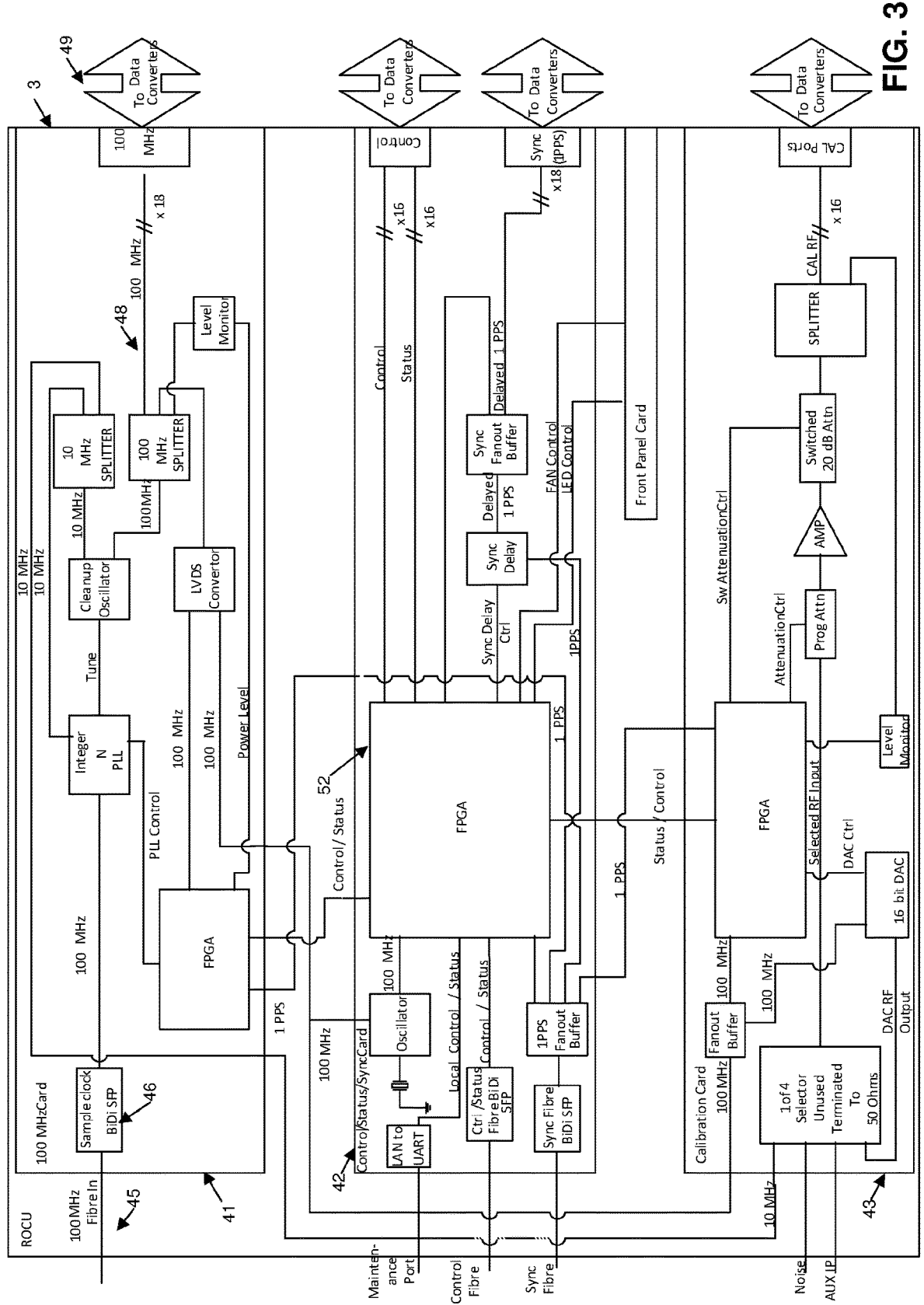
FIG. 3 illustrates the internal architecture of an optical receiver unit called the Receive Optical Controller Unit (ROCU)

Turning now to FIG. 3, there is illustrated in more detail one form of the ROCU 3 of FIG. 1. The ROCU includes three cards 41, 42, 43, with a first card providing hundred megahertz clocking signals 41, a second card for providing control status and sync signals 42, and a third calibration card 43 for measuring the delay in calibration between the input signal and the output signal.

The clocking card 41 receives an input clocking signal 45 which is sampled 46 and converted to a corresponding electrical output signal 48 which is forwarded to each digital receiver unit (10 of FIG. 1). The control status sync card 42 is responsible for sending control status information between the ROCU and TOCU in addition to controlling the various data digital receiver units. It can operate around a core FPGA 52.

The calibration card 43 is responsible for regularly receiving and calibrating the distance between the ROCU and TOCU.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality.

That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of distance of synchronizing a series of remote optical receiver points with an optical transmission point, the method comprising:
   (a) sending an optical timing pulse from the optical transmission point to each of the series of remote optical receiver points and back;
   (b) determining a round trip time of each of the timing pulses; and
   (c) storing an indicative measure of the roundtrip time of each of the timing pulses and utilising the indicative measures to adjust the timing of signals at the remote optical receiver points to determine the relative reception times of signals received by the series of remote optical receiver points.

2. The method of claim 1 further comprising iteratively repeating the steps (a) to (c) to adjust the timing of signals received at the remote optical receiver points.

3. A timing system, compising:
   a transmission unit configured to transmit optical timing signals from the transmission unit to a series of receiver units the series of receiver units being interconnected to the transmission unit and adapted to receive the optical timing signals and to retransmit the optical timing signals back to the transmission unit;
   a delay calculation unit, configured to iteratively determine a signal delay between the transmission unit and the receiver units; and
   a signal adjustment unit configured to adjust a timing of transmission signals on the basis of the determined signal delay.

4. The timing system of claim 3, wherein the receiver units further include optical conversion units for receiving and converting the optical timing signals into corresponding electrical timing signals for use by the receiver units.

* * * * *